(12) United States Patent
Cheng et al.

(10) Patent No.: US 10,674,584 B2
(45) Date of Patent: Jun. 2, 2020

(54) LIGHTING SYSTEM AND DRIVING CIRCUIT THEREOF

(71) Applicant: I-SHOU UNIVERSITY, Kaohsiung (TW)

(72) Inventors: Chun-An Cheng, Kaohsiung (TW); Chin-Chih Lai, Kaohsiung (TW); Yi-Ling Chen, Kaohsiung (TW); Pei-Jung Hsieh, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 16/145,217

(22) Filed: Sep. 28, 2018

(65) Prior Publication Data

US 2019/0380179 A1 Dec. 12, 2019

(30) Foreign Application Priority Data

Jun. 12, 2018 (TW) .............................. 107120172 A (51) Int. Cl.
*H05B 33/08* (2020.01)
*H02M 1/34* (2007.01)
(Continued)

(52) U.S. Cl.
CPC .......... *H05B 45/37* (2020.01); *F21V 23/003* (2013.01); *H02M 1/34* (2013.01); *F21Y 2115/10* (2016.08)

(58) Field of Classification Search
CPC .................. H05B 33/08; H05B 33/0815; H05B 33/0818; H05B 33/0824; H05B 33/0845;
(Continued)

(56) References Cited

U.S. PATENT DOCUMENTS 5,898,581 A * 4/1999 Liu .................... H02M 1/34
                                                363/132
8,339,055 B2 * 12/2012 Zhan ................ H05B 33/0815
                                                315/219
(Continued)

FOREIGN PATENT DOCUMENTS

CN    101919146    7/2013
CN    101990344    8/2015
(Continued)

OTHER PUBLICATIONS

"Office Action of Taiwan Counterpart Application", dated May 29, 2019, pp. 1-6.

*Primary Examiner* — Thai Pham
(74) *Attorney, Agent, or Firm* — JCIPRNET (57) ABSTRACT

A lighting system and a driving circuit thereof are provided. The driving circuit is configured to drive a light emitting device. The driving circuit includes a bulk voltage converter. The bulk voltage converter receives an input voltage and converts the input voltage to generate a driving voltage. The bulk voltage converter includes a snubber circuit, a power switch, and an inductor. The snubber circuit receives the input voltage through a first node and generates a snubber voltage at a second node according to the input voltage. The power switch is turned on or off according to a control signal. The inductor is coupled between the first node and a third node. The driving circuit is coupled to the light emitting device through the first node and the third node and provides the driving voltage to the light emitting device.

11 Claims, 6 Drawing Sheets

(51) Int. Cl.
*F21V 23/00* (2015.01)
*H05B 45/37* (2020.01)
*F21Y 115/10* (2016.01)

(58) Field of Classification Search
CPC ........ H05B 37/02; H02M 1/34; F21V 23/003; F21Y 2115/10
See application file for complete search history.

(56) References Cited

U.S. PATENT DOCUMENTS

| | | | |
|---|---|---|---|
| 9,190,917 B2* | 11/2015 | Hwang | H02M 3/33523 |
| 9,271,353 B2* | 2/2016 | Chen | H05B 33/0896 |
| 9,295,117 B2* | 3/2016 | Acatrinei | H05B 33/0815 |
| 9,735,669 B2* | 8/2017 | Gao | H02M 1/4208 |
| 9,784,440 B2* | 10/2017 | Erdener | H05B 33/0845 |
| 9,791,110 B2* | 10/2017 | Hu | F21K 9/64 |
| 2013/0063039 A1* | 3/2013 | Hwang | H02M 3/33523 315/223 |
| 2015/0035450 A1* | 2/2015 | Werner | H05B 33/0851 315/291 |
| 2015/0188412 A1* | 7/2015 | Imanaka | H05B 33/0815 315/200 R |

FOREIGN PATENT DOCUMENTS

| | | |
|---|---|---|
| TW | I436689 | 5/2014 |
| TW | I578852 | 4/2017 |

* cited by examiner

LIGHTING SYSTEM AND DRIVING CIRCUIT THEREOF

CROSS-REFERENCE TO RELATED APPLICATION

This application claims the priority benefit of Taiwan application serial no. 107120172, filed on Jun. 12, 2018. The entirety of the above-mentioned patent application is hereby incorporated by reference herein and made a part of this specification.

TECHNICAL FIELD

The disclosure relates to a lighting system and a driving circuit thereof; more particularly, the disclosure relates to a lighting system having a power factor correction capability a driving circuit thereof.

DESCRIPTION OF RELATED ART

With the rise of environmental awareness, electrical energy utilization efficiency of electronic devices has become an important design specification. Particularly, in a lighting system, a light emitting diode (LED) has been often applied as a light emitting device according to the related art. With the same illumination brightness, the light emitting device (the LED) requires power consumption of one ten thousandth that of an incandescent bulb and one half that of a fluorescent tube. Such excellent power saving effects lead to the prosperous development of the LED lighting system and relevant technologies.

According to the related art, in a driving circuit of the light emitting device, a highly complex circuit has been frequently applied to improve the efficiency of electrical energy consumption and achieve better power saving effects, which often requires complex designs and large circuit components. Hence, how to reduce the number of components of the driving circuit and simultaneously improve the performance of the driving circuit is an important topic for designers in the pertinent field.

SUMMARY

The disclosure provides a lighting system and a driving circuit thereof which have the power factor correction capabilities and may reduce power loss.

In an embodiment of the invention, a driving circuit configured to drive a light emitting device is provided. The driving circuit includes a bulk voltage converter. The bulk voltage converter receives an input voltage and converts the input voltage to generate a driving voltage. The bulk voltage converter includes a snubber circuit, a power switch, and an inductor. The snubber circuit receives the input voltage through a first node and generates a snubber voltage at a second node according to the input voltage. The power switch is coupled between the second node and a reference ground terminal and turned on or off according to a control signal. The inductor is coupled between the first node and a third node. The driving circuit is configured to be coupled to the light emitting device through the first node and the third node and provides the driving voltage to the light emitting device.

In an embodiment of the invention, a lighting system including the driving circuit and a light emitting device is provided. The light emitting device is coupled to the driving circuit and receives the driving voltage.

In view of the above, the bulk voltage converter having the snubber circuit is provided herein. The inductor in the bulk voltage converter is being operated in a discontinuous conduction mode (DCM), so that the driving circuit is able to perform the power factor correction function, and total harmonic distortion (THD) may be reduced.

In order to make the aforementioned and other features and advantages provided in the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
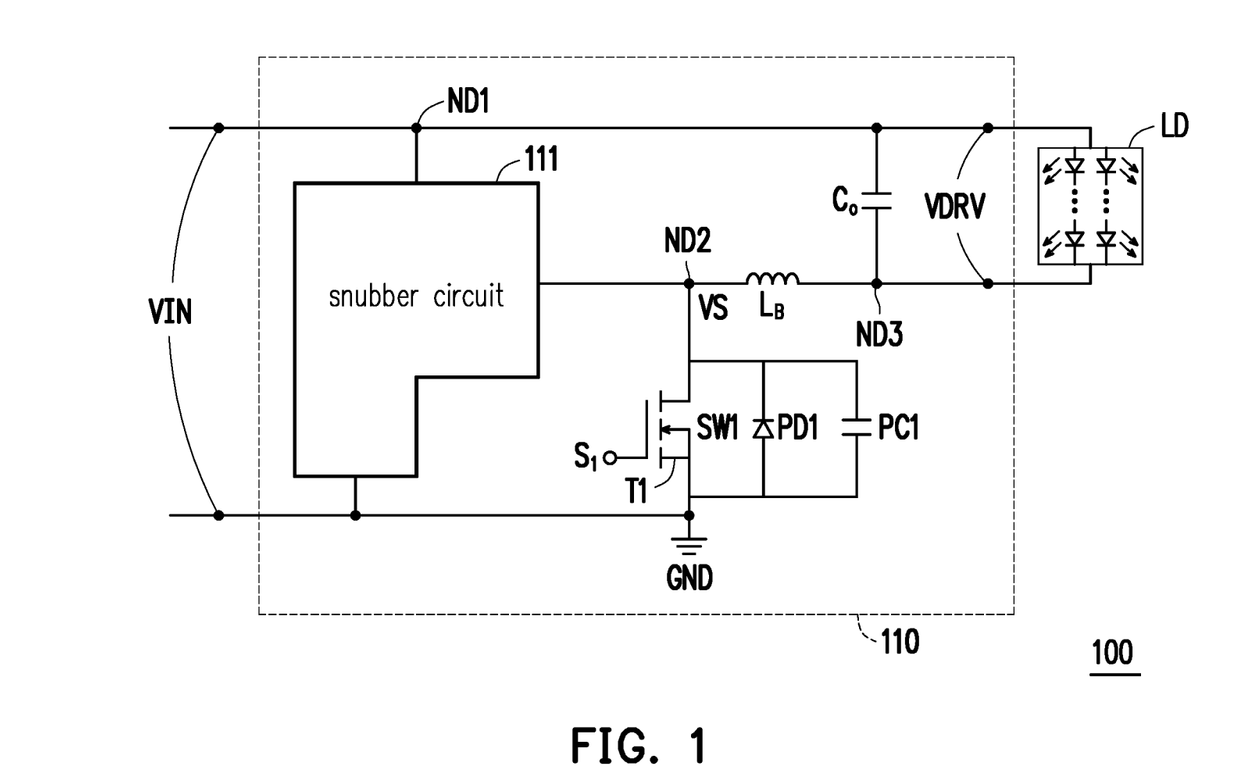
FIG. 1 is a schematic view of a lighting system according to an embodiment of the invention.

Please refer to FIG. 1, which is a schematic view of a lighting system according to an embodiment of the invention. The lighting system 100 includes a driving circuit having a bulk voltage converter 110, and the driving circuit is configured to drive a light emitting device LD. The light emitting device LD may be constituted by one or more LEDs, which should not be construed as a limitation in the disclosure. The bulk voltage converter 110 receives an input voltage VIN and performs a bulk voltage conversion operation on the input voltage VIN to generate a driving voltage VDRV. In the present embodiment, the bulk voltage converter 110 includes a snubber circuit 111, an inductor $L_B$, a power switch SW1, and an output capacitor $C_O$. The snubber circuit 111 receives the input voltage VIN through a first node ND1 and generates a snubber voltage VS at a second node ND2 according to the input voltage VIN. The power switch SW1 is coupled between the second node ND2 and a reference ground terminal GND and turned on or off according to a control signal $S_1$. In the present embodiment, the power switch SW1 is implemented by a transistor T1, wherein a first terminal and a second terminal of the transistor T1 are respectively coupled to the second node ND2 and the reference ground terminal GND, and a control terminal of the transistor T1 receives the control signal $S_1$. According to the present embodiment, there may be a parasitic capacitor PCI and a parasitic diode PD1 between the first terminal and the second terminal of the transistor T1, an anode of the parasitic diode PD1 is coupled to the reference ground terminal GND, and a cathode of the parasitic diode PD1 is coupled to the second node ND2.

In another aspect, an inductor $L_B$ is coupled between the first node ND1 and a third node ND3, wherein the driving circuit 110 is coupled to the light emitting device through the first node ND1 and the third node ND3 and provides the driving voltage VDRV to the light emitting device LD. The output capacitor $C_O$ is coupled between the first node ND1 and the third node ND3 and configured to stabilize the value of the driving voltage VDRV.

According to the present embodiment, during the operation of the driving circuit 110, the input voltage VIN may oscillate due to actions of turning on/off internal components of the circuit (e.g., the power switch SW1), which may interfere peripheral circuits. Hence, the snubber circuit 111 may lessen the possible oscillation of the input voltage VIN and generate the relatively stable snubber voltage VS.

On the other hand, the bulk voltage converter 110 provided in the present embodiment utilizes one single power switch SW1 to be turned on or off, so that the inductor $L_B$ acting as a magnetized inductor is being operated in a DCM. Thereby, the power factor correction function may be guaranteed, and THD may be reduced.

Figure 2:
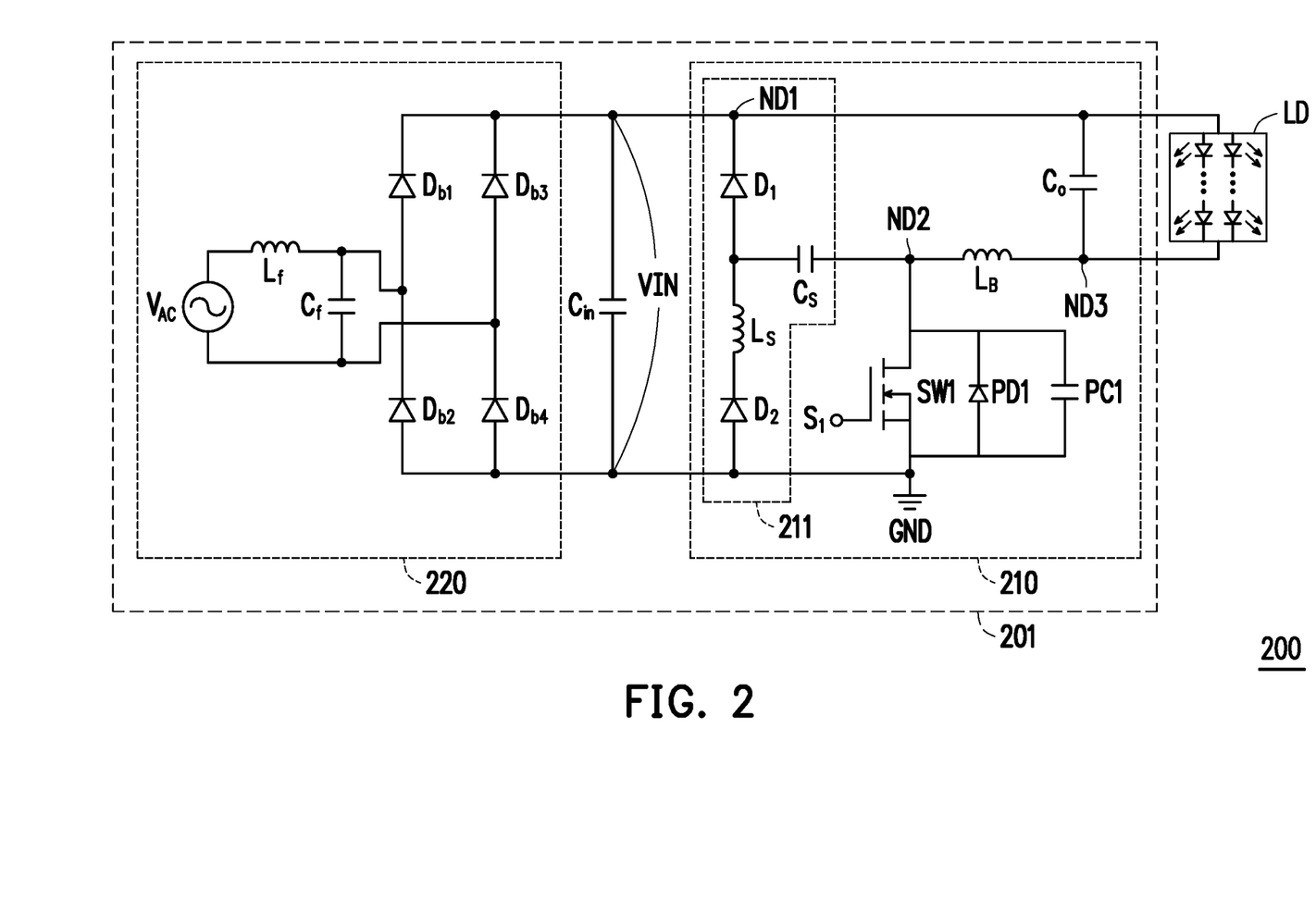
FIG. 2 is a schematic view of a lighting system according to another embodiment of the invention.

Please refer to FIG. 2, which is a schematic view of a lighting system according to another embodiment of the invention. The lighting system 200 includes a driving circuit 201 and a light emitting device LD. The driving circuit 201 generates a driving voltage to drive the light emitting device LD. The driving circuit 201 includes a current rectifying circuit 220, an input capacitor $C_{in}$, and a bulk voltage conversion circuit 210. The current rectifying circuit 220 includes a filter constituted by an inductor $L_f$ and a capacitor $C_f$ and includes a bridge current rectifier constituted by diodes $D_{b1}$-$D_{b4}$. The current rectifying circuit 220 receives an alternating voltage VAC and performs a filtering operation and a current rectifying operation on the alternating voltage VAC to generate an input voltage VIN.

In the present embodiment, the bulk voltage conversion circuit 210 includes a snubber circuit 211, a power switch SW1, an inductor $L_B$, and an output capacitor $C_O$. The snubber circuit 211 includes diodes $D_1$ and $D_2$, an inductor $L_S$, and a capacitor $C_S$, wherein a cathode of the diode $D_1$ is coupled to the first node ND1, and an anode of the diode $D_1$ is coupled to a first terminal of the inductor $L_S$. A second terminal of the inductor $L_S$ is coupled to a cathode of the diode $D_2$, and an anode of the diode $D_2$ is coupled to the reference ground terminal GND. Besides, the capacitor is coupled between the first terminal of the inductor $L_S$ and the second node ND2.

In the present embodiment, the power switch SW1 is coupled between the second node ND2 and the reference ground terminal GND and turned on or off according to a control signal $S_1$. The inductor $L_S$ is coupled between the second node ND2 and the third node ND3, and the output capacitor $C_O$ is coupled between the first node ND1 and the third node ND3.

Please refer to FIG. 3A to FIG. 3D for the operation details of the driving circuit 201. FIG. 3A to FIG. 3D are schematic views illustrating an equivalent circuit of the driving circuit in multiple motion modes according to an embodiment of the invention.

Figure 3A:
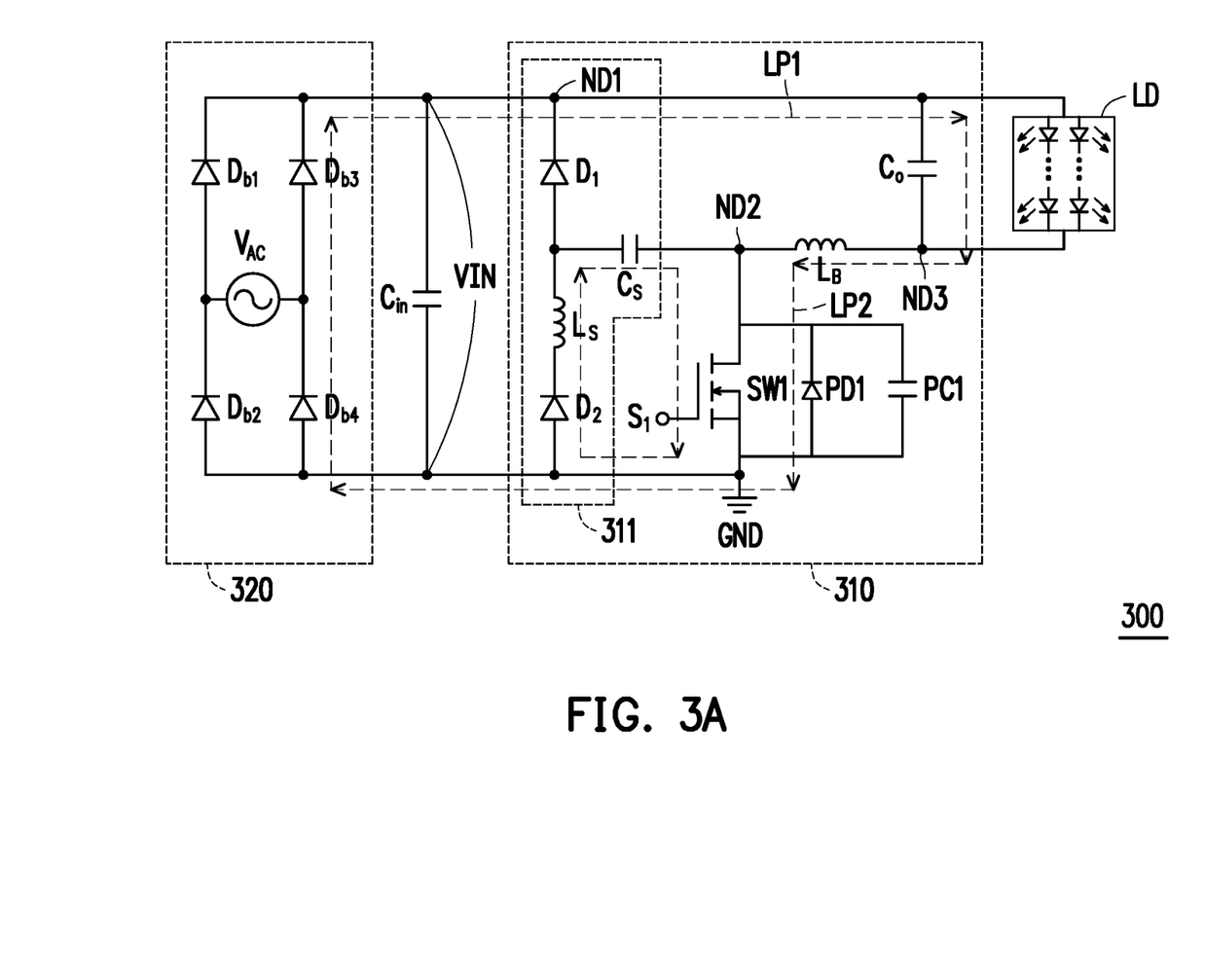
FIG. 3A to FIG. 3D are schematic views illustrating an equivalent circuit of the driving circuit in multiple motion modes according to an embodiment of the invention.

In the present embodiment, the driving circuit 300 includes a bulk voltage conversion circuit 310 and a current rectifying circuit 320. As shown in FIG. 3A, the driving circuit 300 is operated in a first motion mode, and the current rectifying circuit 320 performs a current rectifying operation on the alternating voltage VAC through the bridge current rectifier constituted by the diodes $D_{b1}$-$D_{b4}$ and thereby generates the input voltage VIN. At the same time, the power switch SW1 is switched on according to the control signal $S_1$; as such, a loop LP1 is generated among diodes $D_{b3}$-$D_{b4}$, the light emitting device LD, the inductor $L_B$, and the power transistor SW1, and the input capacitor $C_{in}$ may provide electrical energy to the light emitting device LD and the inductor $L_B$ through the loop LP1. In another aspect, when the power switch SW1 is switched on, another loop LP2 is generated among the $D_2$, the inductor $L_S$, the capacitor $C_S$, and the power switch SW1. The capacitor $C_S$ provides electrical energy to the inductor $L_S$ through the loop LP2. That is, in the first motion mode, the currents on the inductor $L_B$ and the inductor $L_S$ both linearly increase.

In the present embodiment, when the currents on the inductor $L_B$ and the inductor $L_S$ are raised to a predetermined threshold, the power switch SW1 may be correspondingly turned off, and the first motion mode then ends.

Figure 3B:
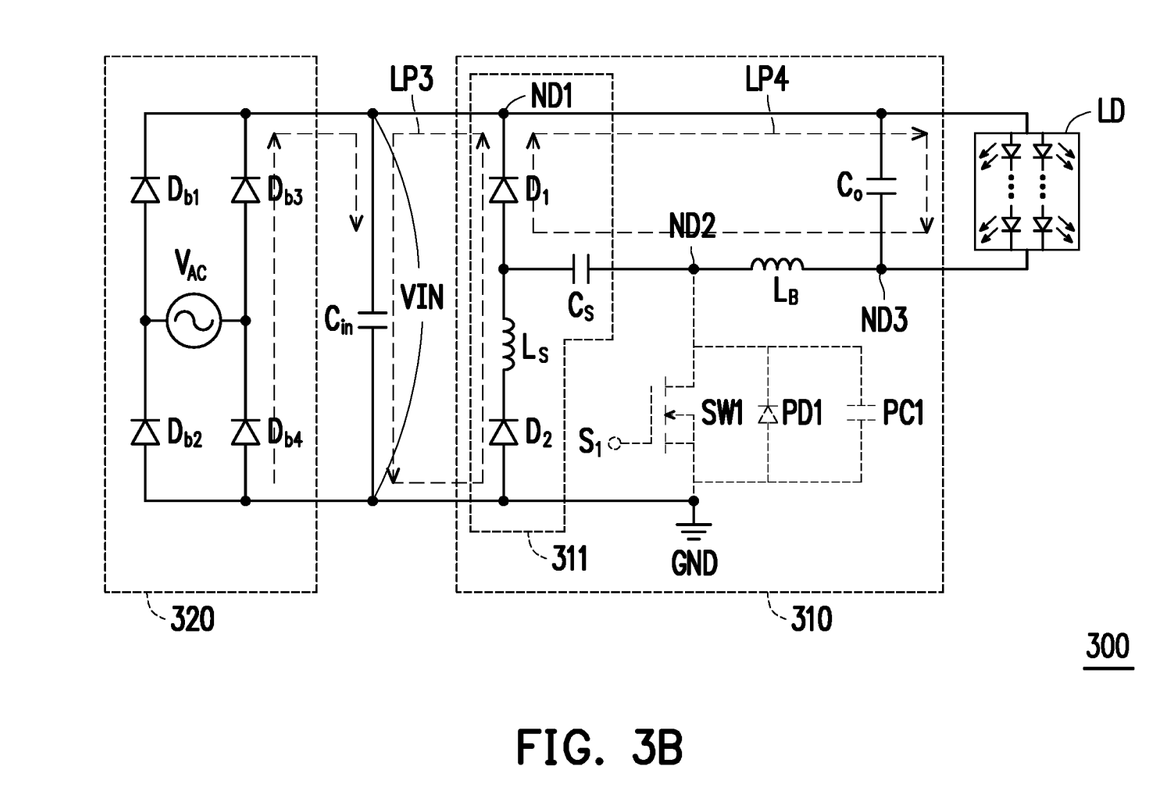

Next, as shown in FIG. 3B, the driving circuit 300 may enter the second motion mode. In the second motion mode, the power switch SW1 is turned off according to the control signal $S_1$. Meanwhile, the diodes $D_1$ and $D_2$ are turned on, and a loop LP3 is generated among the diode $D_1$, the inductor $L_S$, the diode $D_2$, and the input capacitor $C_{in}$. The inductor $L_S$ may provide the electrical energy back to the input terminal of the bulk voltage converter 310 through the loop LP3 and store the electrical energy in the input capacitor $C_{in}$, so as to prevent the waste of the electrical energy. At this time, the current on the inductor $L_S$ linearly decreases.

From another perspective, in the second motion mode, another loop LP4 may be generated among the turned-on diode $D_1$, the light emitting device LD, the inductor $L_B$, and the capacitor $C_S$. The electrical energy of the inductor $L_B$ is transmitted to the light emitting device LD through the loop LP4 and is applied to drive the light emitting device LD. At this time, the current on the inductor $L_B$ linearly decreases.

Incidentally, after the electrical energy of the inductor $L_S$ is completely released, the diode $D_2$ is switched off, the loop LP3 is cut off, and the second motion mode ends.

Figure 3C:
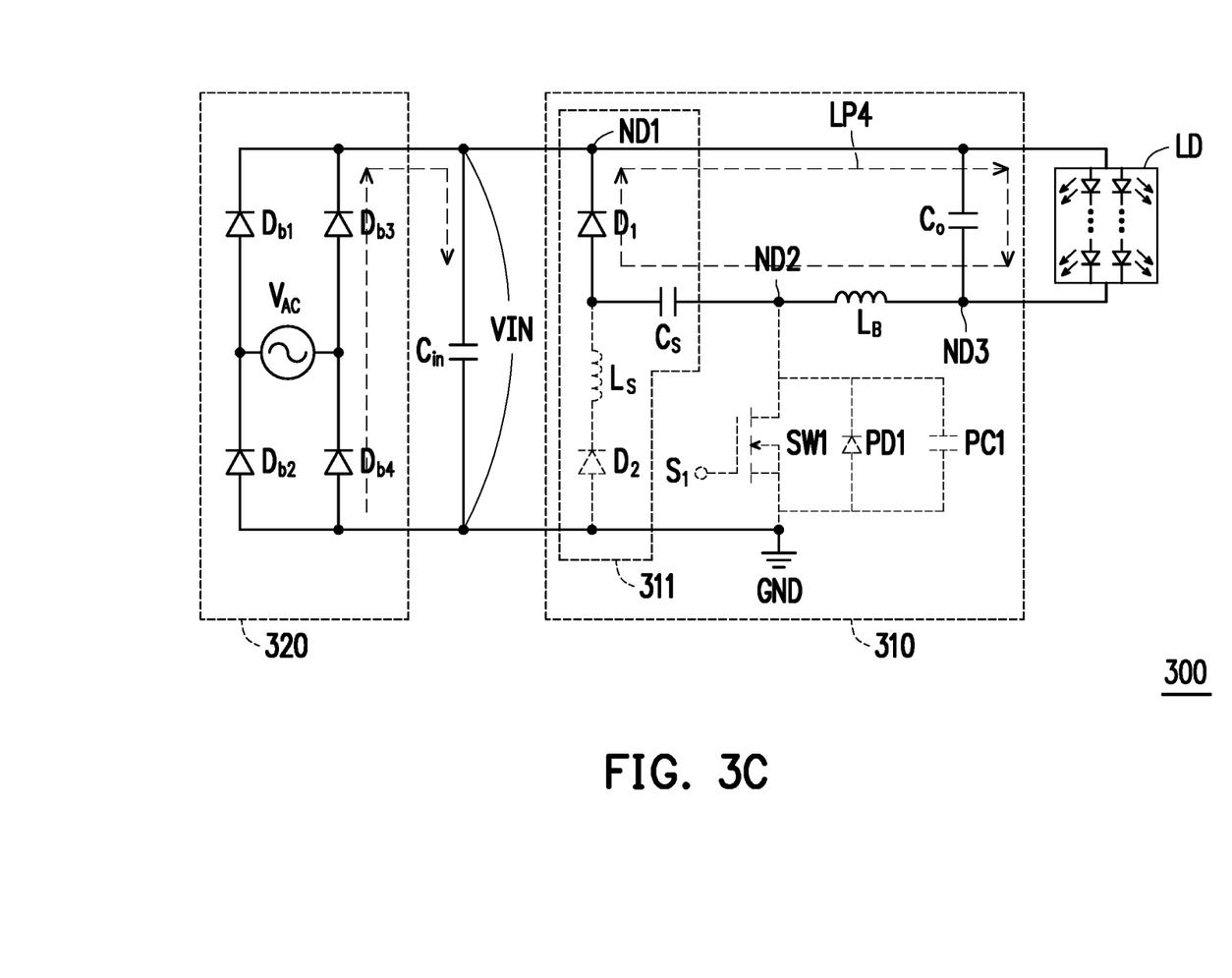

As shown in FIG. 3C, the driving circuit 300 may enter the third motion mode. Besides, in the third motion mode, the power switch SW1 is continuously turned off according to the control signal $S_1$.

In the third motion mode, the loop LP4 remains operative, and the inductor $L_B$ continues to provide the electrical energy to the light emitting device LD. After the electrical energy of the inductor $L_B$ is completely released, the third motion mode ends.

Figure 3D:
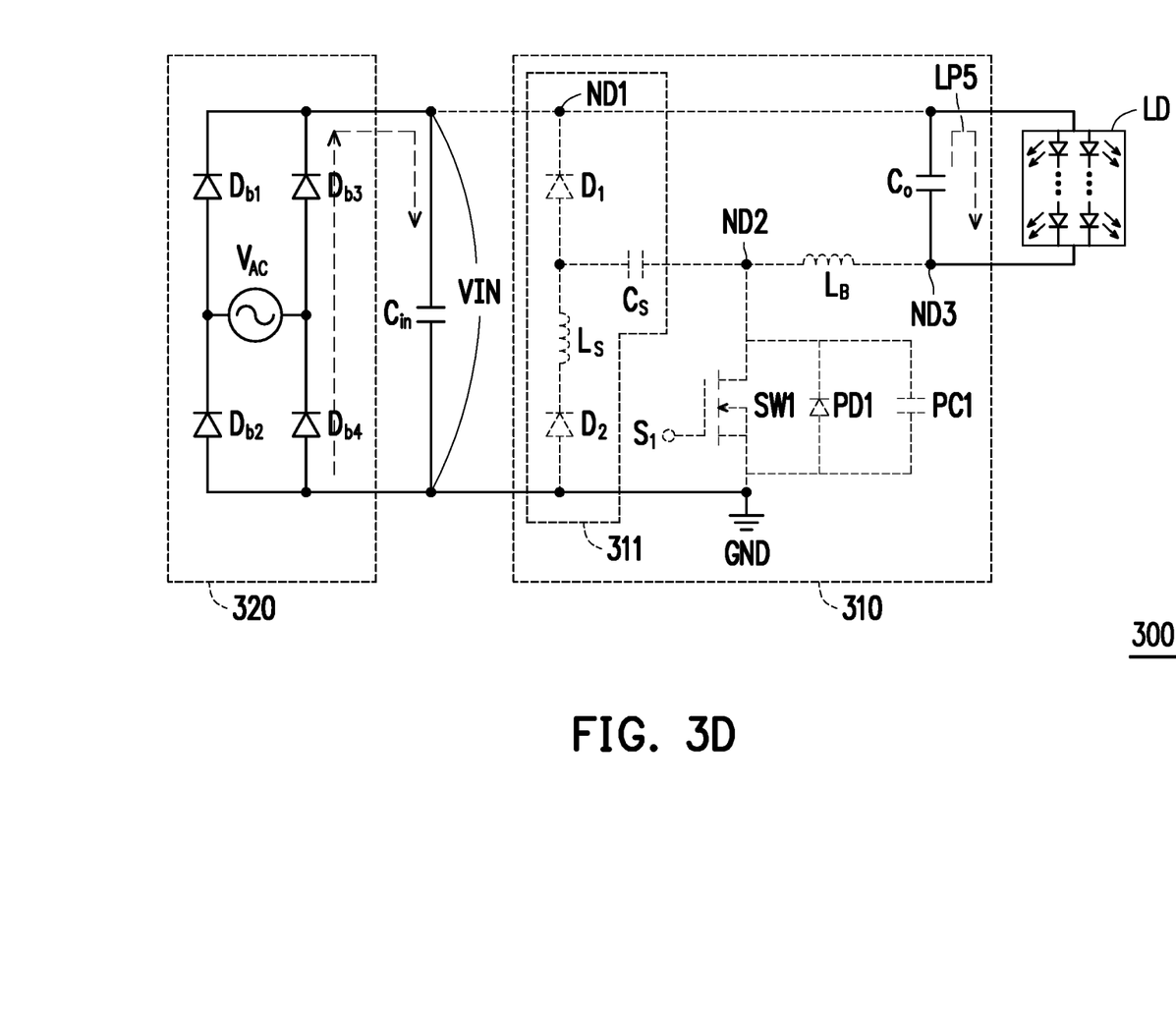

As shown in FIG. 3D, the driving circuit 300 may enter the fourth motion mode. Besides, in the third motion mode, the power switch SW1 is continuously turned off according to the control signal $S_1$. After the third motion mode ends, the diode $D_1$ is switched off, and the loop LP4 is cut off. At this time, a loop LP5 is generated between the output capacitor $C_O$ and the light emitting device LD. The output capacitor $C_O$ provides the electrical energy to drive the light emitting device LD. The fourth motion mode may continue until the electrical energy of the output capacitor $C_O$ is completely consumed.

After the fourth motion mode ends, the first motion mode shown in FIG. 3A may resume, and the second motion mode, the third motion mode, and the fourth motion mode sequentially operate, so as to continuously drive the light emitting device LD. Through periodically switching on and off the power switch SW1, the light emitting device LD may stay operative.

To sum up, in one or more embodiments of the invention, the snubber circuit and the bulk voltage conversion circuit are combined, and one single power switch is switched on or off to generate the driving voltage. The snubber circuit and the bulk voltage conversion circuit may share the circuit components, so as to reduce the usage of the circuit components effectively and lower the product costs as well as the design complexity. Besides, the lighting system provided in one or more embodiments of the invention has the advantages of high power factor, low input current, and high efficiency.

It will be apparent to those skilled in the art that various modifications and variations can be made to the structure provided herein without departing from the scope of protection. In view of the foregoing, it is intended that the disclosure cover modifications and variations provided they fall within the scope of the following claims and their equivalents.

What is claimed is:

1. A driving circuit configured to drive a light emitting device, the driving circuit comprising:
   a bulk voltage converter receiving an input voltage and converting the input voltage to generate a driving voltage, the bulk voltage converter comprising:
      a snubber circuit receiving the input voltage through a first node and generating a snubber voltage at a second node according to the input voltage;
      a power switch coupled between the second node and a reference ground terminal and turned on or off according to a control signal; and
      an inductor coupled between the second node and a third node,
   wherein the bulk voltage converter is coupled to the light emitting device through the first node and the third node and provides the driving voltage to the light emitting device,
   wherein the snubber circuit comprises:
      a first diode, a cathode of the first diode being coupled to the first node;
      a second inductor, a first terminal of the second inductor being coupled to an anode of the first diode;
      a third diode, a cathode of the third diode being coupled to a second terminal of the second inductor, an anode of the third diode being coupled to the reference ground terminal; and
      a capacitor coupled between the anode of the first diode and the second node.

2. The driving circuit as recited in claim 1, wherein when the driving circuit is in a first motion mode, the power switch is turned on, the capacitor provides electrical energy to the second inductor through the power switch and the second diode, and an electrical current on the first inductor and the second inductor linearly increases.

3. The driving circuit as recited in claim 2, wherein when the driving circuit is in a second motion mode, the power switch is turned off, the first diode and the second diode are turned on, the first inductor provides electrical energy to the capacitor and the light emitting device through the first diode, and the second inductor transmits the electrical energy back to an input terminal of the bulk voltage converter through the first diode and the second diode,
   wherein the second motion mode follows the first motion mode.

4. The driving circuit as recited in claim 3, wherein when the driving circuit is in the second motion mode, the electrical current on the first inductor and the second inductor linearly decreases.

5. The driving circuit as recited in claim 3, wherein when the driving circuit is in a third motion mode, the second diode is cut off, the first inductor provides electrical energy to the capacitor and the light emitting device through the first diode, and the electrical current on the first inductor linearly decreases,
   wherein the third motion mode follows the second motion mode.

6. The driving circuit as recited in claim 5, further comprising:
   an output capacitor coupled between the first node and the second node.

7. The driving circuit as recited in claim 6, wherein when the driving circuit is in a fourth motion mode, the power switch is turned off, the first diode and the second diode are cut off, and the output capacitor provides electrical energy to the light emitting device.

8. The driving circuit as recited in claim 1, wherein the power switch comprises a power transistor, a first terminal of the power transistor is coupled to the second node, a second terminal of the power transistor is coupled to the reference ground terminal, and a control terminal of the power transistor receives the control signal.

9. The driving circuit as recited in claim 1, further comprising:
   a current rectifying circuit generating the input voltage according to an alternating voltage; and
   an input capacitor coupled between the first node and the reference ground terminal.

10. A lighting system comprising:
    the driving circuit as recited in claim 1; and
    the light emitting device coupled to the driving circuit to receive the driving voltage.

11. The light system as recited in claim 10, wherein the light emitting device is a light emitting diode tube.

* * * * *